United States Patent [19]

Mitchell et al.

[11] Patent Number: 5,056,026
[45] Date of Patent: Oct. 8, 1991

[54] USER MODIFIABLE FUEL INJECTION COMPUTER

[76] Inventors: Steven J. Mitchell; William R. Mitchell, both of 10 Macintyre Crescent, Sylvania, New South Wales, Australia, 2224

[21] Appl. No.: 381,691
[22] PCT Filed: Nov. 4, 1988
[86] PCT No.: PCT/AU88/00430
§ 371 Date: Jul. 5, 1989
§ 102(e) Date: Jul. 5, 1989
[87] PCT Pub. No.: WO89/04425
PCT Pub. Date: May 18, 1989

[30] Foreign Application Priority Data
Nov. 6, 1987 [AU] Australia ............... P15283

[51] Int. Cl.⁵ ............................................. G06F 15/20
[52] U.S. Cl. ..................... 364/431.03; 364/431.04; 364/424.04; 73/117.3; 73/119 A
[58] Field of Search ............... 364/431.03, 431.04, 364/431.05, 424.03, 424.04, 551.01; 73/117.3, 119 A; 123/417, 480

[56] References Cited
U.S. PATENT DOCUMENTS

| | | | |
|---|---|---|---|
| 4,084,240 | 4/1978 | Lappington | 364/431.04 |
| 4,334,425 | 6/1982 | Crane | 364/431.01 |
| 4,376,428 | 3/1983 | Hata et al. | 364/431.04 |
| 4,398,259 | 8/1983 | Levine | 364/431.04 |
| 4,497,057 | 1/1985 | Kato et al. | 364/431.04 |
| 4,677,558 | 6/1987 | Bohmer et al. | 364/431.03 |
| 4,725,955 | 2/1988 | Kobayashi et al. | 123/417 |
| 4,738,238 | 4/1988 | Ohishi | 364/431.05 |
| 4,839,811 | 6/1989 | Kanegae et al. | 364/424.03 |
| 4,866,618 | 9/1989 | Tamura et al. | 364/431.03 |

FOREIGN PATENT DOCUMENTS

| | | | |
|---|---|---|---|
| 3318410 | 11/1984 | Fed. Rep. of Germany | 364/431.03 |
| 0155403 | 9/1985 | Fed. Rep. of Germany | 364/431.03 |

Primary Examiner—Parshotam S. Lall
Assistant Examiner—Gary D. Yacura
Attorney, Agent, or Firm—Townsend and Townsend

[57] ABSTRACT

A user accessible electornic fuel injection system is disclosed which is modifiable to fit a range of engine configurations, preferably with a staged fuel injection curve and with the capability of recording speed, fuel delivery rate and other engine performance parameters. The system includes computer software which directly controls the fuel injection hardware in an automobile. This software contains a serial communication routine which services the external requests of a control program running on a personal computer, plus engine management software which controls timing functions based on engine related information.

8 Claims, 4 Drawing Sheets

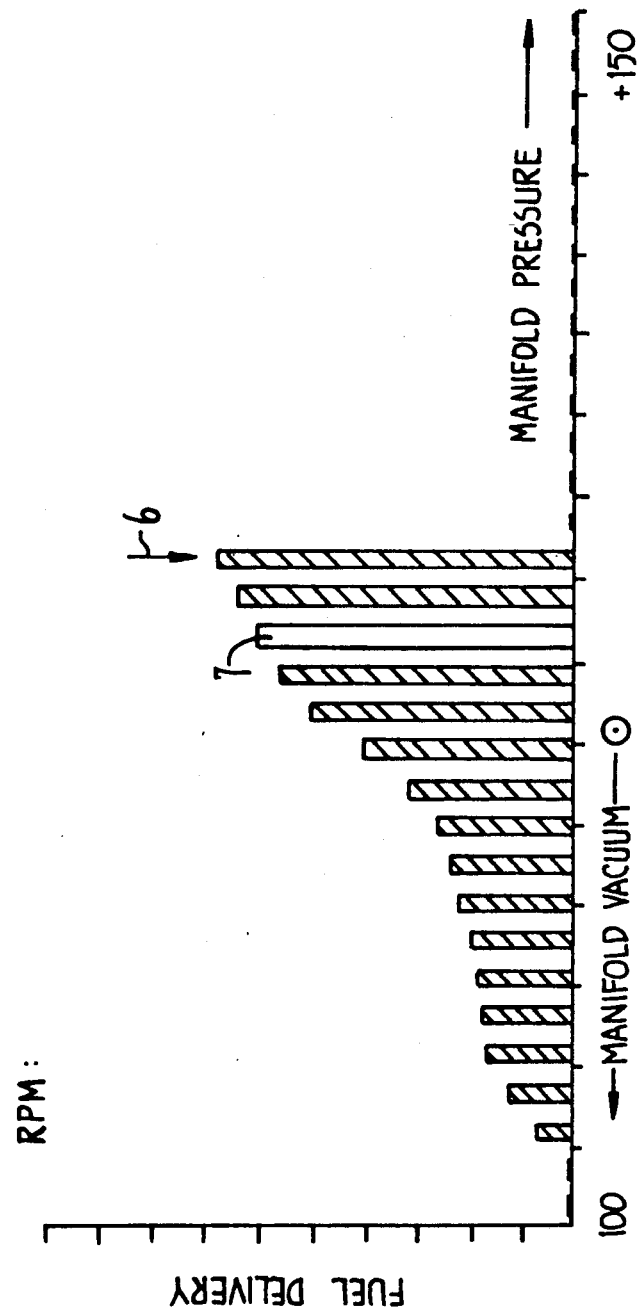

USER MODIFIABLE FUEL INJECTION COMPUTER

This invention relates to improvements in electronic fuel injection computers.

BACKGROUND OF THE INVENTION

Motor vehicles are now commonly manufactured with electronic fuel injection (E.F.I.). There are good reasons for the move to E.F.I. A good E.F.I. system will produce considerably more power using less fuel and also generate less pollution than carburetion on the same vehicle. In an age of high fuel costs, energy conservation and restrictive pollution laws, the trend towards E.F.I. will continue.

Present E.F.I. computers however are "black boxes" which are dedicated to a particular engine model. They cannot be readily serviced or interchanged with other types of vehicles. This has the disadvantage that conventional naturally aspirated engines cannot be easily converted to E.F.I. Further, in factory equipped E.F.I. vehicles any subsequent modifications to the engine such as for example turbo charging or increase in the compression ratio, cannot be matched by the required alteration to the E.F.I.

SUMMARY OF THE INVENTION

It is therefore an object of this invention to ameliorate the aforementioned disadvantages and accordingly a user accessible E.F.I. computer is disclosed which is modifiable to fit a range of engine configurations.

Preferably an E.F.I. computer according to this invention is user accessible using an external personal computer. Such E.F.I. computer can thus be initially programmed and/or modified to produce any fuel delivery curve required by the user.

Preferably an E.F.I. computer according to this invention is also adaptable to provide a "staged" fuel injection curve such as that required by forced induction engines.

Preferably a computer according to this invention is also adapted to record or "data log" various engine parameters such as speed, fuel delivery etc. in a manner whereby it can be later read and analysed by the user.

BRIEF DESCRIPTION OF THE DRAWINGS

One preferred embodiment of this invention will now be described with reference to the attached representation in which:

FIG. 4 is an example of a fuel inspection bar chart as relating to a typical 4 cylinder automobile.

DESCRIPTION OF THE PREFERRED EMBODIMENTS

Figure 1:
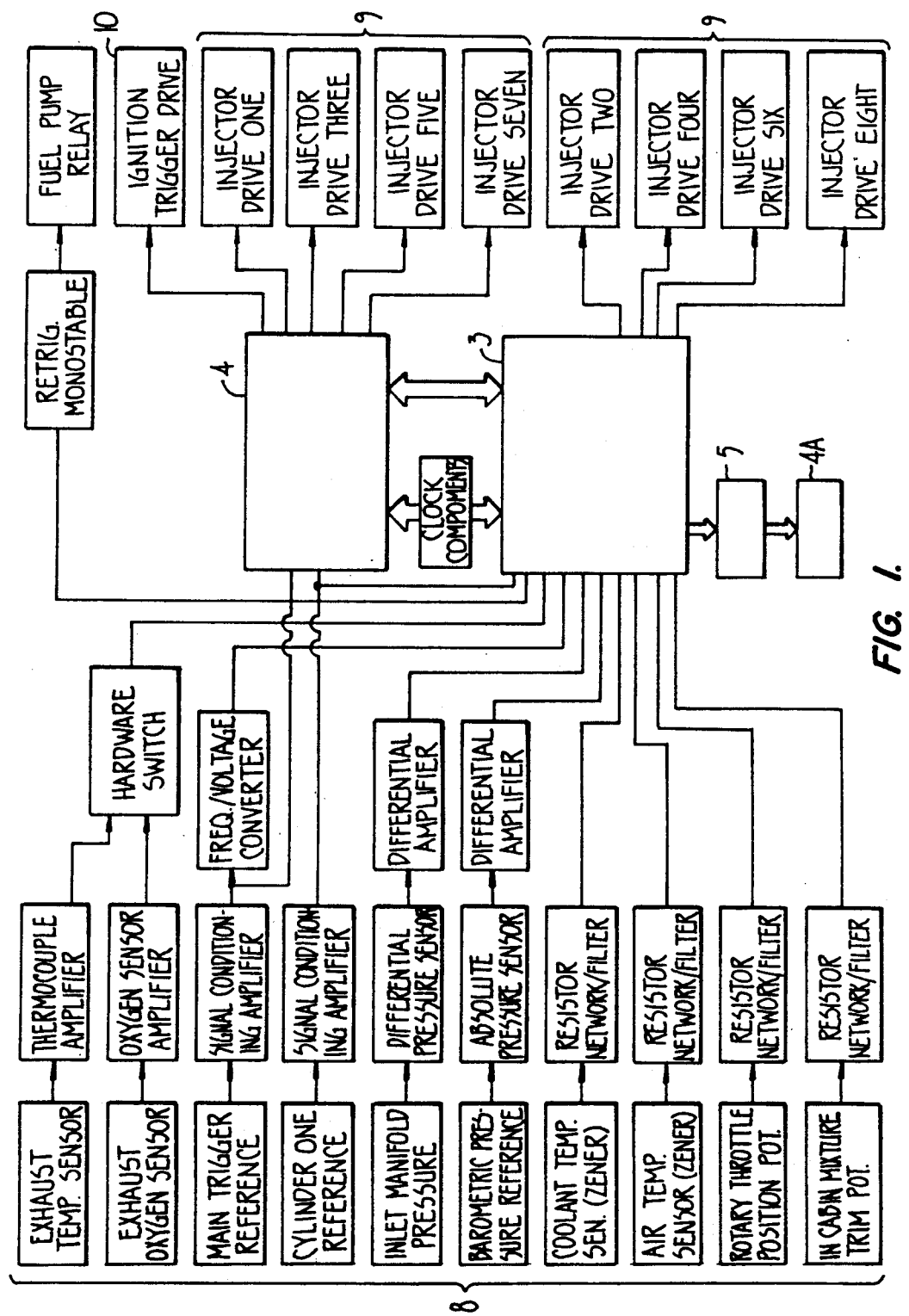
FIG. 1 is a block diagram showing the main components of an E.F.I. computer and engine sensors.
Figure 2:
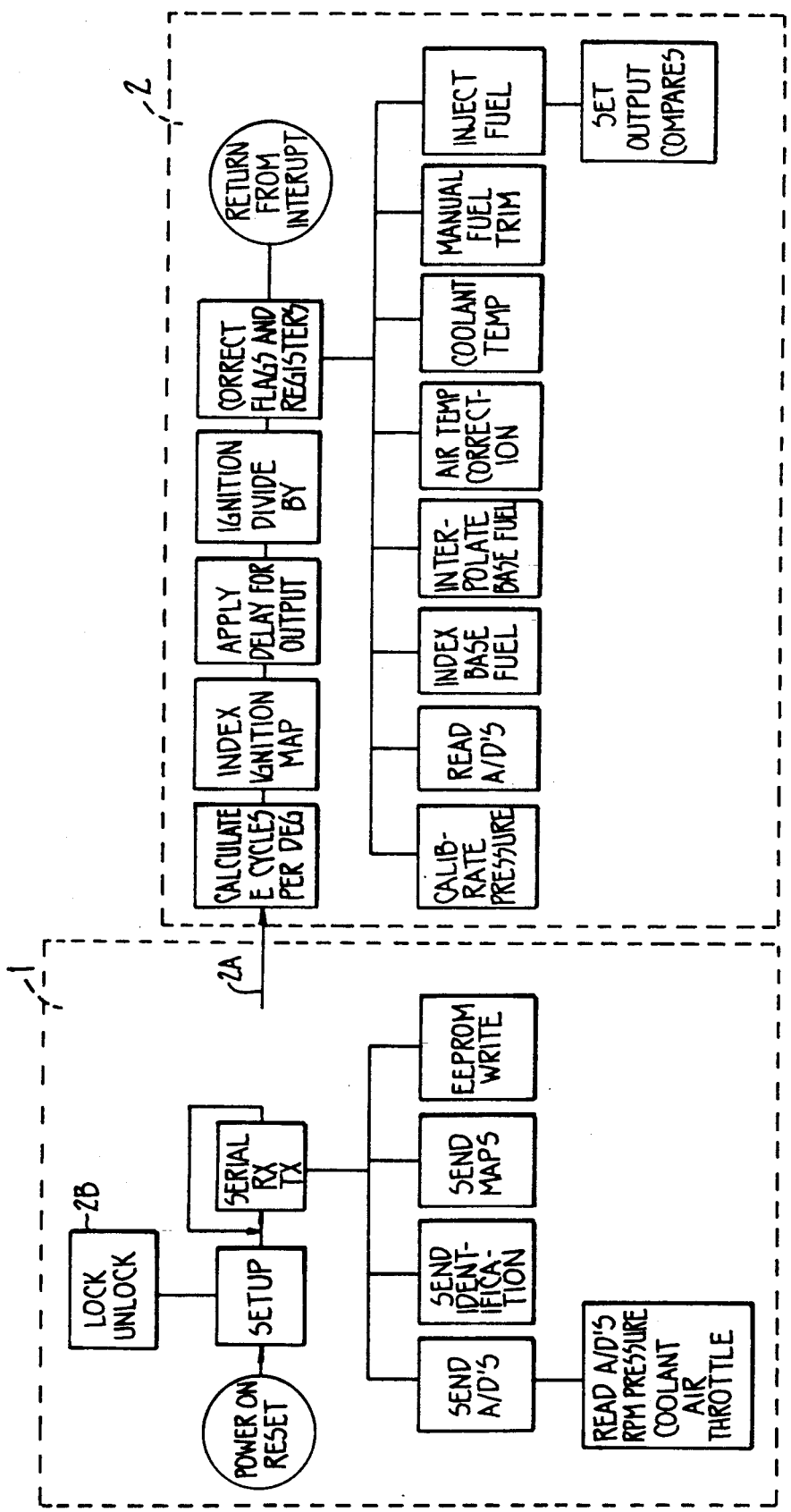
FIG. 2 is a software flow chart of the E.F.I. computer of FIG. 1.
Figure 3:
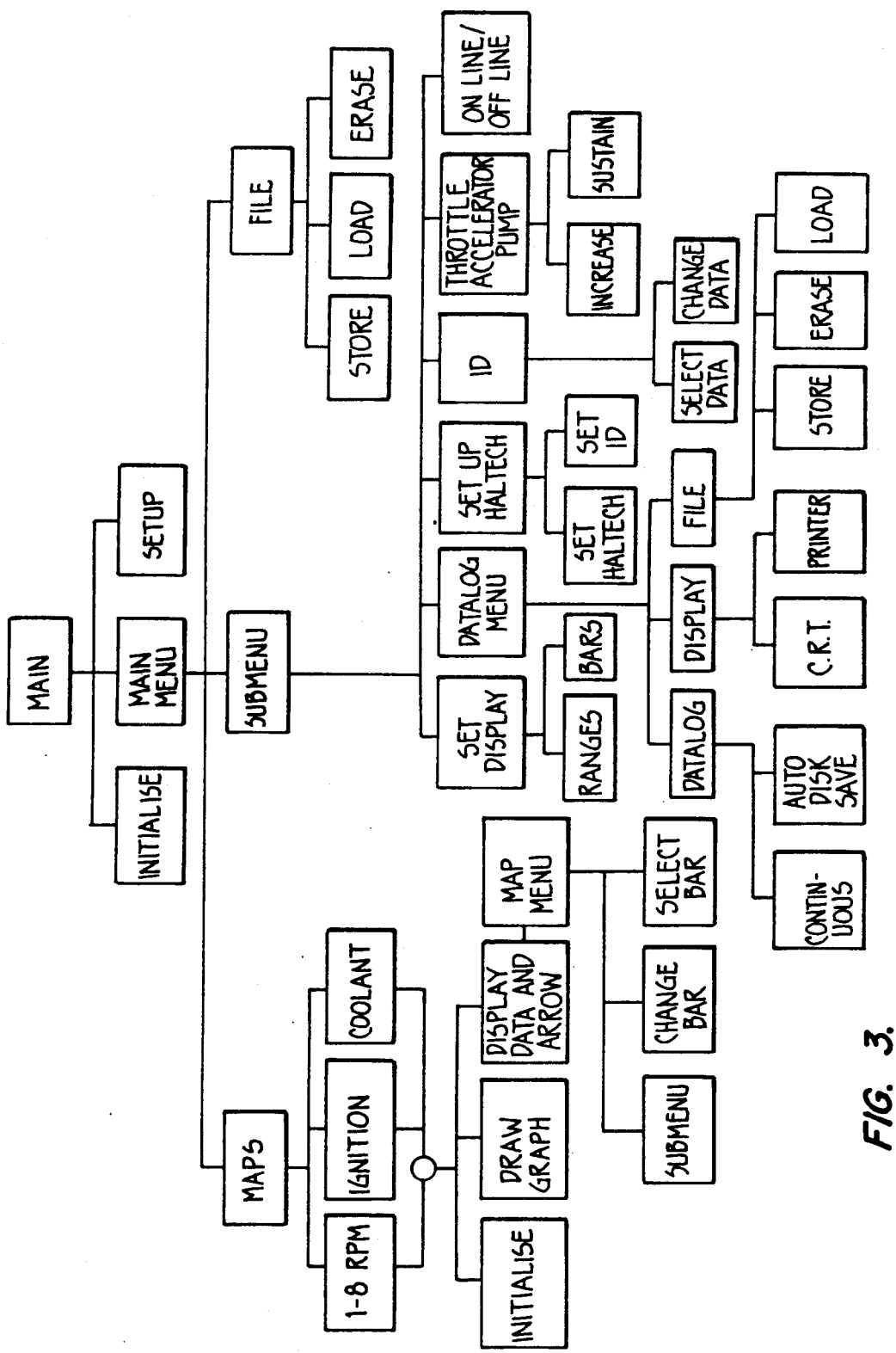
FIG. 3 is a software flow chart of a personal computer used to program the E.F.I. computer of FIGS. 1 and 2.

There are three distinct parts to the programmable fuel injection computer according to this invention. These are the hardware (FIG. 1) which remains in the car, the software (FIG. 2) which drives this hardware and the software (FIG. 3) which allows the system to be configured to suit a particular vehicle and which runs on an external personal computer.

The software which directly controls the hardware has two parts. The main program 1 is a serial communication routine which services the external requests of a control program running on the personal computer. This communications program allows the system information and variables to be displayed and accessed by a user using the personal computer. The serial communication program acts as a slave to the program in the personal computer. If the engine being controlled is not running then the system continually runs the serial communication program.

The second part of the software manages the engine. This software 2 is called as the result of an interrupt trigger 2A by either of two engine position sensors. These trigger pulses interrupt the serial communication program and start the engine management program. The engine management program processes all of the engine related information and sets up output compare timers to correctly control both the fuel injectors and ignition timing. Once these functions have been carried out the program flow returns to the serial communication program until it is again interrupted.

As well as these two main programs the in-car computer software has an optional routine 2B which controls an external key-pad. Its purpose is to act as a remote electronic key, for locking and unlocking the car computer. To unlock the system the operator must enter a four digit pin number before an interrupt mask on the engine position sensors will be removed and program control passed to the serial routine. The pin number entered by the operator is compared to an internal reference stored in EEPROM, giving a 1 in 10,000 chance of guessing the internal key. In addition to this the operator has the ability to create and delete an additional pin number as well as the prime pin number at will. This allows access to the vehicle by persons other than themselves without disclosing their prime pin number, and also allows them to change the prime pin number if necessary. To lock the system a single key is depressed when the engine is off and the ignition is in the accessories or on position. This causes an internal flag to be set in EEPROM and program control to be passed to key-pad routine.

The fuel injection computer employs two separate MCU's 3 and 4 which operate as master and slave. The assembly language software written to control these devices can be treated as a single program. The use of two MCU's is only to provide the necessary hardware.

When the power is applied a reset pulse triggers the program to perform a setup routine which first initialises variables, registers and then copies a block of program code from EEPROM to RAM. This block of code is used to enable writing to the EEPROM. This routine then checks to see if the computer is in a locked or unlocked state; if it's locked then program control is passed to the lock/unlock routines where it will remain until it is successfully unlocked.

Program control is then passed to the serial receive/transmit routines where it remains until it receives an external interrupt. It is these routines which allow 'on line' communications to take place with an external computer 4A running system software. This is done via a serial communications interface 5. Engine parameters, identification block of memory and the fuel map block of memory can all be passed to the external computer on its request. As well as this the external computer can write data to specific areas of memory —for example a change to a fuel map data element would occur whenever the system was running on line and a user was editing one of the fuel delivery maps displayed on the personal computer.

When the engine is turning sensors relay position pulses to the external interrupts of the MCU. This in turn vectors the fuel/ignition program to commence running, which performs the following functions.

(i) Calculates the number of E clock cycles per engine revolution.
(ii) Indexes the ignition maps using engine RPM.
(iii) Calculates an ignition timing correction with respect to engine load.
(iv) Calculates and applies delay to produce an ignition pulse out.
(v) Applies ignition divide by.
(vi) Indexes base fuel with respect to RPM and pressure.
(vii) Interpolates fuel value with respect to adjacent value in next RPM range.
(viii) Calculates and applies air temperature correction.
(ix) Indexes coolant map based on coolant value and apply correction.
(x) Applies percentage correction from manual fuel trim.
(xi) Applies final fuel value to the fuel injection routine.
(xii) Returns from interrupt to serial routine.

The controlling program (FIG. 3) runs in a personal computer serially connected to the in-car computer. It is designed to give the user access to system information and allow the user to alter variables which tailor the system to a particular engine's requirements. This program is essentially graphically driven so as to allow the user to see trends in successive variables and to allow the user to gain an overview of the information currently being applied to the engine.

The three main objectives of this program are to graphically display the variables being applied to the engine, to give the user real time feedback as to which variable is being used at any instant and to allow the user to alter that variable whilst the engine is still running.

The information relating to any two engine variables is stored as a look-up table (see table 1). Each of these tables is called a map. Each map is displayed graphically with a bar graph. This bar graph shows the user the relationship between the two variables.

TABLE 1

| | | | | |
|---|---|---|---|---|
| \<F1\> | : RANGE | (1) | 0-1000 RPM | ******** |
| \<F2\> | : RANGE | (2) | 1000-2000 RPM | Press F1-F9 |
| \<F3\> | : RANGE | (3) | 2000-3000 RPM | to view maps. |
| \<F4\> | : RANGE | (4) | 3000-4000 RPM | |
| \<F5\> | : RANGE | (5) | 4000-5000 RPM | |
| \<F6\> | : RANGE | (6) | 5000-6000 RPM | |
| \<F7\> | : RANGE | (7) | 6000-7000 RPM | |
| \<F8\> | : RANGE | (8) | 7000-8000 RPM | Press "L" to load vehicle in formation. |
| \<F9\> | : CURRENT POSITION | | | |
| \<F10\> | : WARM UP CHARACTERISTICS | | | |
| \<S\> | : STORE VECHICLE INFORMATION TO DISK | | | |
| \<L\> | : LOAD VECHICLE INFORMATION FROM DISK ******** | | | |
| \<M\> | : SUB MENU | All secondary functions in sub menu press 'M' \<ESC\> : EXIT to system | | |

The program's main menu 20 preferably enables the selection of eight RPM indexed "Maps", two Ignition "Maps" and a warm-up cycle "Map" 23. The main menu also allows for map handling functions to floppy disk storage. These functions include storing maps to disk, loading maps from disk 24, erasing of maps from disks 25 and ID files 26.

The RPM indexed maps are preferably spaced at intervals of 1000 RPM. Each map is used in that band of 1000 RPM. The RPM maps are graphical representations of engine load versus the injector opening time per engine cycle in milliseconds. The height of each bar in the graph sets the amount of fuel delivered at that load point. An example of such a map is shown in FIG. 4.

The warm-up cycle map relates the increase in the amount of fuel delivered over the engine's entire operating range versus engine temperature. The height of each bar in this map gives the percentage of increased enrichment versus engine temperature.

The first ignition timing map defines ignition timing against engine speed. The height of each bar in this map sets the ignition timing in degrees before top dead center for a given engine speed. The second ignition timing map defines a correction factor, to be applied to the ignition timing calculated from the first map, versus engine load. Each bar in this map sets the correction to be applied for a given engine load.

Feedback as to which bar is currently being used in the map currently being displayed is preferably given by an arrow 6 on the screen (FIG. 4). The arrow points to the bar currently being accessed by the engine. This real time feedback allows the user to move to alter the bar currently being used. The bar 7 currently being adjusted by the user is outlined. A particular bar may be selected and the height changed causing instantaneous real-time change of the actual value within the in-car computer. The height of the bar is proportional to the fuel delivered.

The sub-menu 27 (FIG. 3), accessed from either the main menu 20 or whilst viewing maps allows manipulation of (a) Display characteristics 28 such as the level of screen resolution (it is possible to double the number of bars in a given map), and the ability to set up all eight RPM maps by making them identical.

(b) Access to a set-up program 29 which leads the user through a series of questions to configure the basic system parameters.

(c) Access to a page of identification data 30 (see Table 2) to allow users attempting to change an already configured system to see the system parameters already in use. This identification also includes relevant information about the make, model, registration, engine capacity, service history etc. as well as an hour meter which records the number of computer hours clocked up from new. This information is not directly used by the engine management program. It is present for the benefit of service personnel.

(d) Access to transient response variables used when the throttle position is increased are made via a single screen display of two bars 31, 32. This allows control of the amount and duration, respectively of supplementary fuel added to overcome any lean-out during throttle changes.

(e) The system preferably has a datalog function 33 which allows all of the engine's operating parameters to be recorded up to 20 times a second for later recall and examination. The data recorded preferably includes engine speed, manifold pressure, engine temperature, intake air temperature, throttle position, mixture trim position, air fuel ratio from exhaust gas feedback, exhaust gas temperature, barometric pressure, current RPM range and the bar currently in use in that 'Map' as well as the real time the sample was taken. The datalog can be scrolled through or a statistical analysis of the total information can be displayed. This analysis gives the maximum, minimum and average of each piece of data.

The system allows for an auto disk save function 34 which allows the block of recorded data to be dumped to floppy disk drive storage, once the memory available is full, for later retrieval. This function continues until the disk space available is used up. There are also functions which allow for datalogs to be stored and retrieved from floppy disk storage.

(f) The program can be set to operate off-line to allow the maps and ID to be altered without the system being connected to an In-Car computer.

(g) The engine variables can be brought up on a screen for display. If any engine variable is outside a predetermined bandwidth the screen is preferably highlighted to show a possible fault. This aids service inspections of the system.

(h) Preferably there is a help menu which shows the user which keys select which function.

As mentioned earlier the in-car computer hardware consists of a dual microprocessor based data acquisition and control circuit designed to monitor the operating parameters of an engine and control actuators which supply the engine's fuel and ignition requirements. To this end there are a number of input circuits 8 (FIG. 1) which feed the microprocessors information relating to current engine parameters. These currently include inlet manifold pressure, ambient air temperature, inlet air temperature, engine coolant temperature, exhaust gas temperature, exhaust gas oxygen content, throttle position and engine speed and position.

injector opening time per engine cycle. The injectors are timed to open once per engine cycle in time with the opening of the inlet valve. The opening time of the injector is managed by four output compare timers within each microprocessor. Once the required opening time is calculated by the microprocessor software the calculated opening time is sequentially fed to each output compare timer to actuate the fuel injector solenoid for the required time.

The injector driver circuits are single chip solenoid drivers designed specifically for the control of fuel injectors. The circuits used with these drivers are of a conventional nature. The circuits shown here are directly driven from the outputs of the microprocessors. These circuits give saturation current to ensure fast solenoid opening followed by a holding current of approximately one fourth the saturation current for the remainder of the opening cycle.

The ignition timing is controlled by a fifth output 10 compare timer on the slave microprocessor. Both microprocessors receive two timing signals at fixed points in the engine's cycle. These are a main timing pulse, a fixed number of engine degrees of rotation before each piston reaches top dead centre and a cylinder one timing pulse when cylinder one reaches top dead center. The ignition timing is determined by starting a calculated delay past the receipt of a main trigger pulse.

The drive to trigger the external ignition amplifier is opto-coupled from the output compare timer on the slave microprocessor. The rising edge of the output compare is used to trigger the ignition amplifier.

The two temperatures sensor circuits are used to measure the inlet air temperature and the engine coolant temperature. Each of the temperature sensors is a temperature dependant zener diode in a brass body designed to mount into either the air or coolant stream.

TABLE 2

| | |
|---|---|
| VERSION | FU2-088 |
| OWNER | INVENT ENG. |
| VECHICLE | |
| MAKE | HOLDEN |
| MODEL | GEMINI |
| REGO | HAL001 |
| ENGINE | |
| CYLINDERS | 4 |
| PULSES | 1 |
| SIZE | 2 Lt |
| RPM LIMIT | 8000 |
| PROGRAMMED | |
| DATE | 17JUN88 |
| BY | E.F.I. TECH. |
| NOTE : | MODIFIED   * CHANGE ? <Y> * EXIT : <Esc> |

The circuitry involved for each input is of a conventional nature for the type of parameter measured. For each analogue parameter an analogue signal, proportional to the parameter measure is derived. The microprocessor chosen has on-chip analogue-to-digital converters which allow the parameters to be used by the microprocessor. The microprocessors 3 and 4 (FIG. 1) chosen are configured in a master/slave configuration. Conceptually the Master/Slave set-up means the slave processor 4 is used only to extend the capabilities of the master processor 3 and not as a processor in its own right. The major parameters are fed to, and processed by, one microprocessor which then directs the actions of a slave processor.

Each microprocessor controls four fuel injector solenoid drivers 9 for the control of conventional petrol fuel injectors. The rate of fuel delivery is determined by the The current through the zener is set by a resistor network. The voltage across the zener is proportional to the temperature of the sensor. This voltage is then fed directly to the Master microprocessor Analogue to Digital Input.

The programming interface 5 to the personal computer is via an RS 232C standard serial interface. This interface is made through a single chip driver. The cable from the personal computer to the in-car computer uses three wires. These are serial transmit, serial receive and ground.

The pressure sensor elements are solid state devices. Differential amplifiers are used to amplify the signal from the elements to a level suitable for the Microprocessor Analogue to Digital converters. The differential pressure sensor element is used to measure the pressure inside the inlet manifold with respect to atmospheric pressure. The Absolute pressure sensor is used to measure the ambient atmospheric pressure with respect to an internal vacuum in the sensor element. This allows full load to always index the same bar in the look up tables even with varying ambient pressures. The effects of varying ambient pressures are compensated for by a separate compensation program using the absolute pressure sensor.

The main trigger pulse is referenced to occur a fixed number of engine degrees of rotation before each piston reaches top dead center. This signal is squared and trimmed before being used to trigger both microprocessors and the frequency to voltage converter. The frequency-to-voltage converter is used to derive a voltage proportional to engine speed. This voltage is fed to an Analog to Digital converter on the master microprocessor. This is the main engine speed reference for the system.

The main trigger pulse is also used to trigger a retriggerable monostable. The output of the monostable is continuously on if the trigger pulses occur more than 50 times per minute. The output from the monostable is used to drive a relay which switches an external relay which switches the car's high pressure fuel pumps on.

The exhaust temperature sensor and the exhaust oxygen sensor probe are fed to suitable amplifiers before passing to a hardware switch. The system is preferably configured to run on only one of these sensors at any one time. This is purely a current hardware constraint due to the number of available A/D converters on the master microprocessors and is not essential to the invention.

It is also envisaged that this system would be suitable for use with high pressure in-cylinder fuel injection systems, compression ignition or ignition type internal combustion engines. The basic principles already incorporated in the system can be used to provide a signal to control an electronic pressure regulator to vary the pressure of a high pressure system.

The data log function may also be extended to provide telemetry of the data.

It will thus be appreciated that this invention at least in the form of the embodiment described provides a novel and unique improvement in fuel injection computers for internal combustion engines. Clearly however the particular example disclosed is only the currently preferred form of this invention and a wide variety of modifications may be made which would be apparent to a man skilled in the art. For example a computer according to this invention may also be adapted to control other engine parameters such as valve timimg, transmission shift or suspension adjustment. Further the invention is not limited to the particular installation described but can extend to other industrial applications.

We claim:

1. An E.F.I. computer system for an internal combustion engine comprising:
    control means for controlling E.F.I. equipment in said engine; said control means coupled with
    information means for producing information to fit said engine, said information comprising a range of fuel delivery curves, a range of ignition timing curves, or both;
said control means and information means being modifiable while installed in and during operation of said engine, and further being user-accessible through a serially connected external computer means.

2. An E.F.I. computer system in accordance with claim 1 in which said information means comprises:
    communication means comprising one or more engine sensors for providing information on selected engine parameters to the user upon command from a control program in said external computer means; and
    engine control means for controlling the operation of said engine.

3. An E.F.I. computer system in accordance with claim 2 in which said engine control means include means for setting timers to control engine fuel injectors, ignition timing or both.

4. An E.F.I. computer system in accordance with claim 2 in which said engine control means is programmed to operate during periodic interruptions of said information on selected engine parameters, upon receipt of signals generated from said one or more engine sensors.

5. An E.F.I. computer system in accordance with claim 2 in which said information on selected engine parameters includes fuel delivery maps which show programmed fuel delivery at spaced intervals of rpm.

6. An E.F.I. computer system in accordance with claim 2 in which said fuel delivery maps are in the form of bar graphs.

7. An E.F.I. computer system in accordance with claim 2 in which said engine control means is programmed to operate during periodic interruptions of said information on selected engine parameters, upon receipt of signals generated from said one or more engine sensors, and said information on selected engine parameters includes ignition timing maps showing ignition timing as a function of engine speed.

8. An E.F.I. computer system in accordance with claim 7 in which said ignition timing maps are in the form of bar graphs.

* * * * *